US008903612B2

(12) United States Patent  (10) Patent No.: US 8,903,612 B2
Tejeda et al.  (45) Date of Patent: Dec. 2, 2014

(54) METHOD OF DETERMINING WHEN A PAYLOAD LOADING EVENT IS OCCURRING IN A HAULING MACHINE

(71) Applicant: Caterpillar Inc., Peoria, IL (US)

(72) Inventors: Balmes Tejeda, Peoria, IL (US);
Michael Mitchell, Aurora, IL (US);
Andrew DeHaseth, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 35 days.

(21) Appl. No.: 13/871,412

(22) Filed: Apr. 26, 2013

(65) Prior Publication Data

US 2014/0324303 A1 Oct. 30, 2014

(51) Int. Cl.
*G06F 7/00* (2006.01)
*G01G 23/18* (2006.01)
*B60P 1/00* (2006.01)

(52) U.S. Cl.
CPC ........................................ *B60P 1/00* (2013.01)
USPC ............................................. 701/51; 177/45

(58) Field of Classification Search
USPC ............................................. 701/51; 177/45
See application file for complete search history.

(56) References Cited

U.S. PATENT DOCUMENTS

| 4,635,739 | A | * | 1/1987 | Foley et al. | 177/45 |
| 4,863,337 | A |   | 9/1989 | Ishiguro et al. | |
| 5,391,843 | A |   | 2/1995 | Sato et al. | |
| 5,880,408 | A | * | 3/1999 | Schreiner | 177/136 |
| 6,839,638 | B2 | * | 1/2005 | Lueschow et al. | 702/33 |
| 6,858,809 | B2 | * | 2/2005 | Bender | 177/136 |
| 7,299,692 | B1 | * | 11/2007 | Contreras et al. | 73/146 |
| 7,878,751 | B2 |   | 2/2011 | Hagenbuch | |
| 7,894,961 | B2 | * | 2/2011 | Blackburn et al. | 701/50 |
| 8,412,485 | B2 | * | 4/2013 | Brown | 702/174 |
| 8,700,274 | B1 | * | 4/2014 | Tejeda et al. | 701/50 |
| 2009/0045017 | A1 |   | 2/2009 | Joergensen et al. | |
| 2009/0099886 | A1 |   | 4/2009 | Greiner et al. | |
| 2012/0274121 | A1 |   | 11/2012 | Minoshima et al. | |

FOREIGN PATENT DOCUMENTS

| DE | 102010003921 A1 | 10/2011 |
| EP | 0356067 A2 | 2/1990 |
| EP | 0695930 B1 | 2/1996 |
| JP | 2006-336390 A | 12/2006 |
| WO | WO 2009/008784 A1 | 1/2009 |
| WO | WO 2012/082019 A1 | 6/2012 |
| WO | WO 2012/169358 A1 | 12/2012 |

* cited by examiner

*Primary Examiner* — Thomas G Black
*Assistant Examiner* — Tyler Paige
(74) *Attorney, Agent, or Firm* — Leydig, Voit & Mayer, Ltd.

(57) ABSTRACT

A programmable controller implemented method of determining occurrence of bed loading events in a hauling machine. The method includes determining if the machine was stationary for a period, if the bed is in a loading position, other factors contributed to movement of the machine, calculating a bounce amplitude based upon a filtered machine accelerometer signal, comparing the amplitude with a constant reflecting a minimum amplitude, and identifying a loading event for an amplitude greater than the constant, if the machine has been stationary for a given period, the bed in a loading position, and no other factors caused machine movement.

20 Claims, 5 Drawing Sheets

METHOD OF DETERMINING WHEN A PAYLOAD LOADING EVENT IS OCCURRING IN A HAULING MACHINE

TECHNICAL FIELD

This patent disclosure relates generally to payload hauling machines, and, more particularly to methods of determining when a loading event occurs in a payload hauling machine.

BACKGROUND

Hauling machines are utilized in various industries to transport a payload from one location to another. In order to operate such machines efficiently, it is desirable to carry an optimally sized payload. Loading a machine to less than full capacity may result excess costs associated with unnecessary runs and the acceleration of maintenance schedules. Overloading a machine may result in increased wear and costly maintenance.

Numerous methods have been proposed for determining the mass of payloads in hauling machines. While physically weighing a machine on a scale and then deducting the weight of the machine itself may be a reliable method of measuring a payload, such an arrangement is not practical in large machines. Moreover, physically weighing a machine is generally not possible in the field.

Various methods have been proposed for the operation of hauling machines and monitoring payloads during use. PCT Publication WO 2009/008784 to Volvo Construction Equipment AB discloses a method of operating the hoist cylinder of a tiltable dump body of a vehicle to produce vibrations in the dump body to facilitate dumping. Volvo discloses a number of ways to monitor a payload including monitoring changes in the acceleration of the dump body, as well as amplitudes of movement and changes in a sound of the dump body during vibration.

SUMMARY

The disclosure describes, in one aspect, a method of determining whether an event loading the bed is occurring in a hauling machine having a bed adapted to haul a payload. The method is implemented by a programmable controller. The method includes determining if the machine has been stationary for a given period, determining if the bed is in a position to be loaded, determining if other factors have contributed to movement of the machine, filtering an accelerometer signal associated with movement of the machine to calculate an amplitude of bounce, comparing the amplitude of bounce with a predetermined constant reflecting a minimum amplitude of bounce, and identifying a loading event if the amplitude of bounce is greater than the predetermined constant reflecting a minimum amplitude of bounce, the machine has been stationary for a given period, the bed is in a position to be loaded, and other factors have not caused movement of the machine.

BRIEF DESCRIPTION OF THE DRAWING(S)

While the appended claims set forth the features of the present invention with particularity, the invention and its advantages are best understood from the following detailed description taken in conjunction with the accompanying drawings, of which:

DETAILED DESCRIPTION

Figure 1:
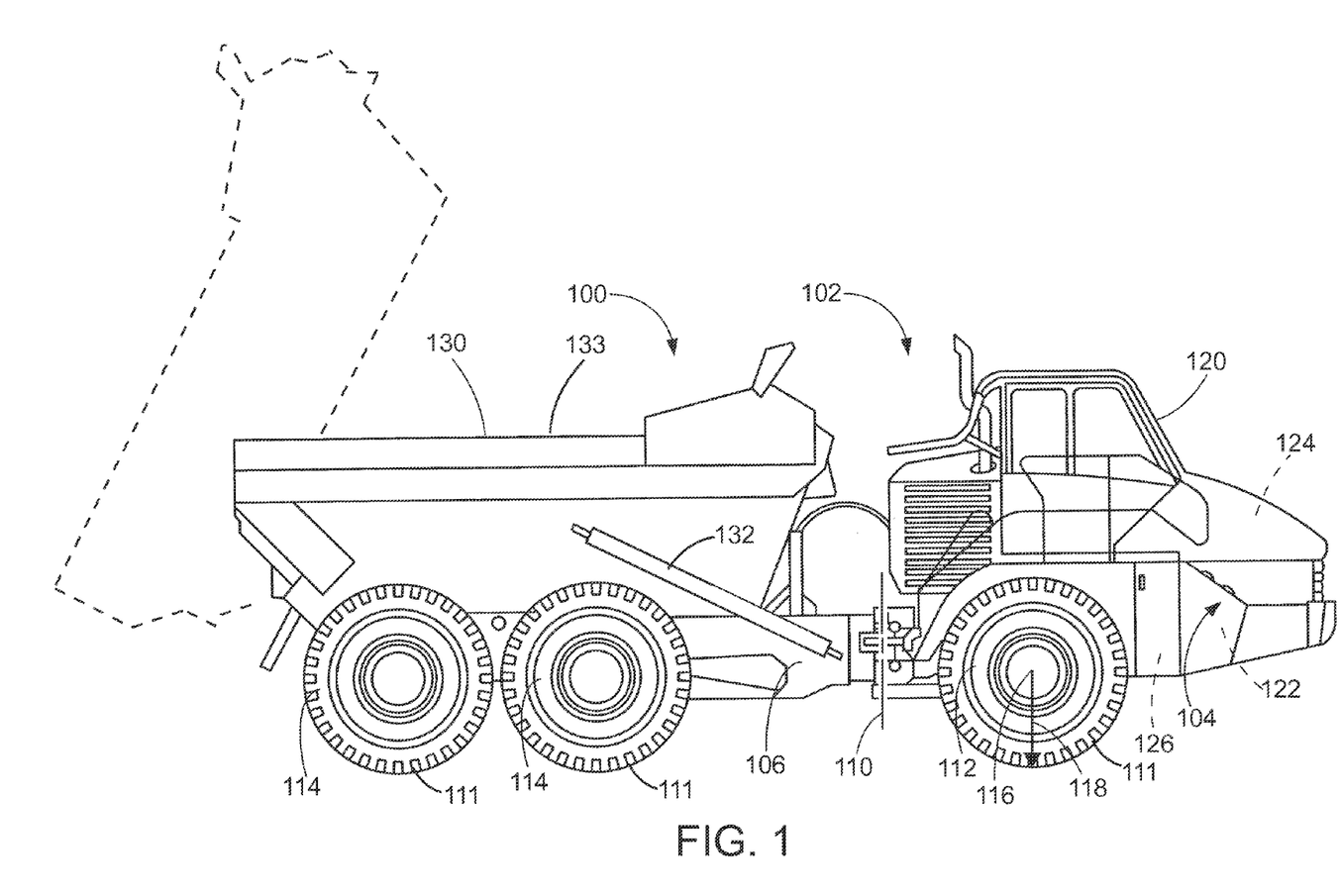
FIG. 1 is a diagrammatical side elevational view of an articulated truck machine/vehicle, which is illustrated as one example of a machine suitable for incorporating a method of determining when a payload loading event is occurring in accordance with the disclosure.

This disclosure relates to hauling machines and the determination of the mass of a carried payload. FIG. 1 that provides a schematic side elevational view of one example of a machine 100 incorporating a machine payload control strategy according to the disclosure. In the illustration of FIG. 1, the machine 100 is a truck, which is one example for a machine to illustrate the concepts of the described machine payload control strategy. While the arrangement is illustrated in connection with a truck, the arrangement described herein has potential applicability in various other types of payload hauling machines, such as wheel loaders, motor graders, etc. The term "machine" refers to any machine that performs some type of operation associated with an industry such as mining, construction, farming, transportation, or any other industry known in the art. For example, the machine may be a dump truck, backhoe, grader, material handler or the like. The term vehicle is intended to incorporate substantially the same scope as the term machine, in that a vehicle is a machine that travels.

Referring to FIG. 1, the illustrated machine 100 is an articulated truck 102 that includes front and rear frame portions 104, 106 coupled at an articulation axis 110, and supported on ground engaging elements 111, such as front wheels 112 and/or rear wheels 114. The front frame portion 104 supports a cab 120, and, typically, a drive system 122. The drive system 122 typically includes an internal combustion engine 124 configured to transmit power to a transmission 126. The transmission in turn may be configured to transmit power to the ground engaging elements 111 (e.g., front wheels 112) by way of axle 116 using any known means. The wheel 112 has a radius 118, which corresponds to the rolling radius 118 of the driven wheel on a driven surface (e.g., the distance from the center of the driven wheel 112 to the ground).

The rear frame portion 106 supports a bed 130. In the illustrated machine 100, the bed 130 may be selectively pivoted between a load position (illustrated) and an unload position (shown in phantom) by one or more hoist cylinders 132 in response to commands from operator hoist control 134 (see FIG. 2) typically located in the cab 120. While an articulated truck 102 with a pivoted bed 130 is illustrated, aspects of this disclosure may apply to other load hauling machines including, for example, unarticulated machines, or machines including a bed that incorporates an ejector plate that may be actuated by one or more dump cylinders to similarly push or eject a payload 133 contained in the bed 130.

Figure 2:
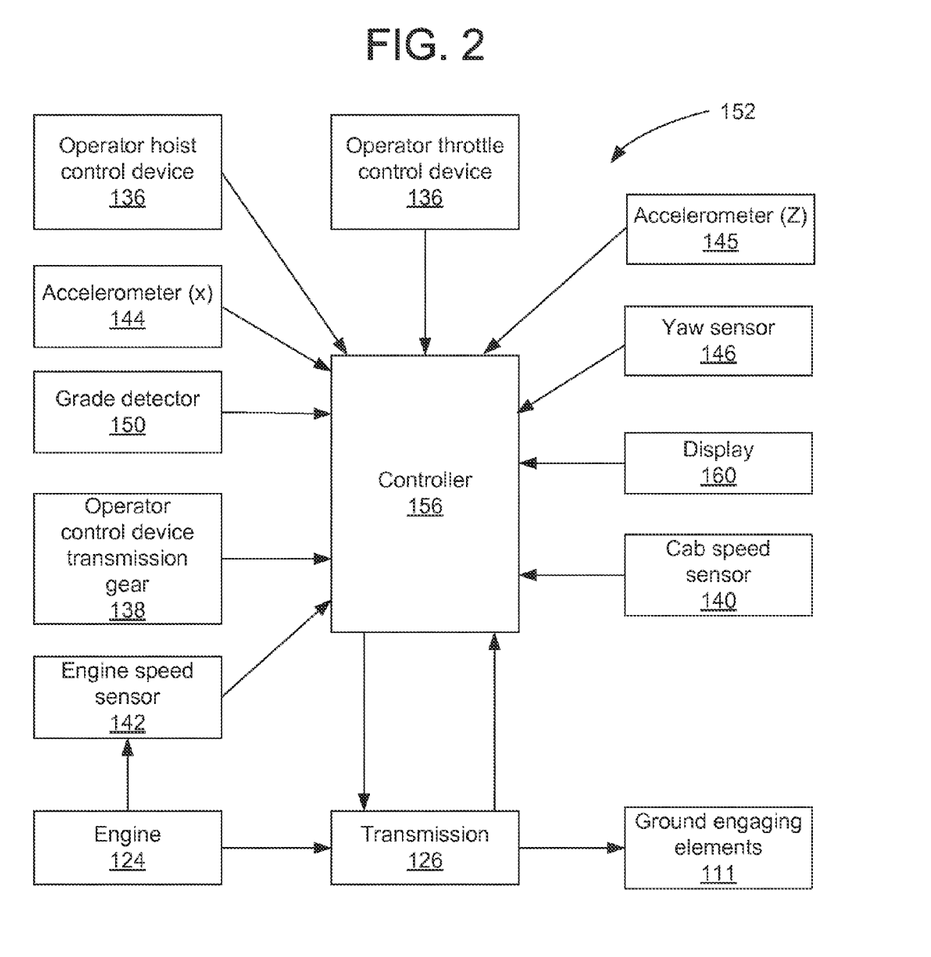
FIG. 2 is a box diagram representation of a programmable controller and inputs to the controller for an exemplary machine in accordance with aspects of methods of the disclosure.

The machine 100 may include additional operator controls, such as a throttle 136, and a transmission gear control 138 by which an operator may choose a particular gear from a given selection of gears (see FIG. 2). The machine 100 may additionally include a plurality of gauges and/or sensors associated with operation of the machine 100, such as a cab speed sensor 140, engine speed sensor 142, accelerometer(s) 144, 145 associated with the fore and aft direction (X) and the vertical direction (Z), and/or yaw sensor 146. The machine 100 may further include sensors adapted to sense environmental characteristics. For example, the machine 100 may include a tilt sensor, inclinometer, or grade detector 150. While each of these controls and sensors is illustrated diagrammatically in the simplified box diagram of a control system 152 in FIG. 2, the machine 100 may include additional, different, or less controls and sensors.

The controls and sensors provide signals indicative of the respective control or sensed feature to a programmable controller 156. During operation of the machine 100, the controller 156 may be configured to receive and process information relating to operation of the machine 100 and to provide a determination of the mass of a payload 133 carried by the machine 100 during dynamic operation by methods described with regard to FIGS. 3-5. The determined mass may be communicatively coupled, for example, to a display 160 within the cab 120 or to a remote operation or monitoring location (not shown). For the purpose of this disclosure, the terms "dynamic operation" or "dynamic conditions" will refer to operations and conditions wherein the machine 100 is moving as a result of operation of the drive system 122 to power ground engaging elements 111, such as the front wheels 112 and/or rear wheels 114.

The controller 156 may include a processor (not shown) and a memory component (not shown). The processor may be microprocessors or other processors as known in the art. In some embodiments the processor may be made up of multiple processors. Instructions associated with the methods described may be read into, incorporated into a computer readable medium, such as the memory component, or provided to an external processor. In alternative embodiments, hard-wired circuitry may be used in place of or in combination with software instructions. Thus, embodiments are not limited to any specific combination of hardware circuitry and software.

The term "computer-readable medium" as used herein refers to any medium or combination of media that is non-transitory, participates in providing computer-executable instructions to a processor for execution facilitating performing a method, implemented by a programmable controller. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer or processor can read.

The memory component may include any form of computer-readable media as described above. The memory component may include multiple memory components.

The controller 156 may be a part of a control module may be enclosed in a single housing. In alternative embodiments, the control module may include a plurality of components operably connected and enclosed in a plurality of housings. In still other embodiments the control module may be located in single location or a plurality of operably connected locations including, for example, being fixedly attached to the machine 100 or remotely to the machine 100.

Figure 3:
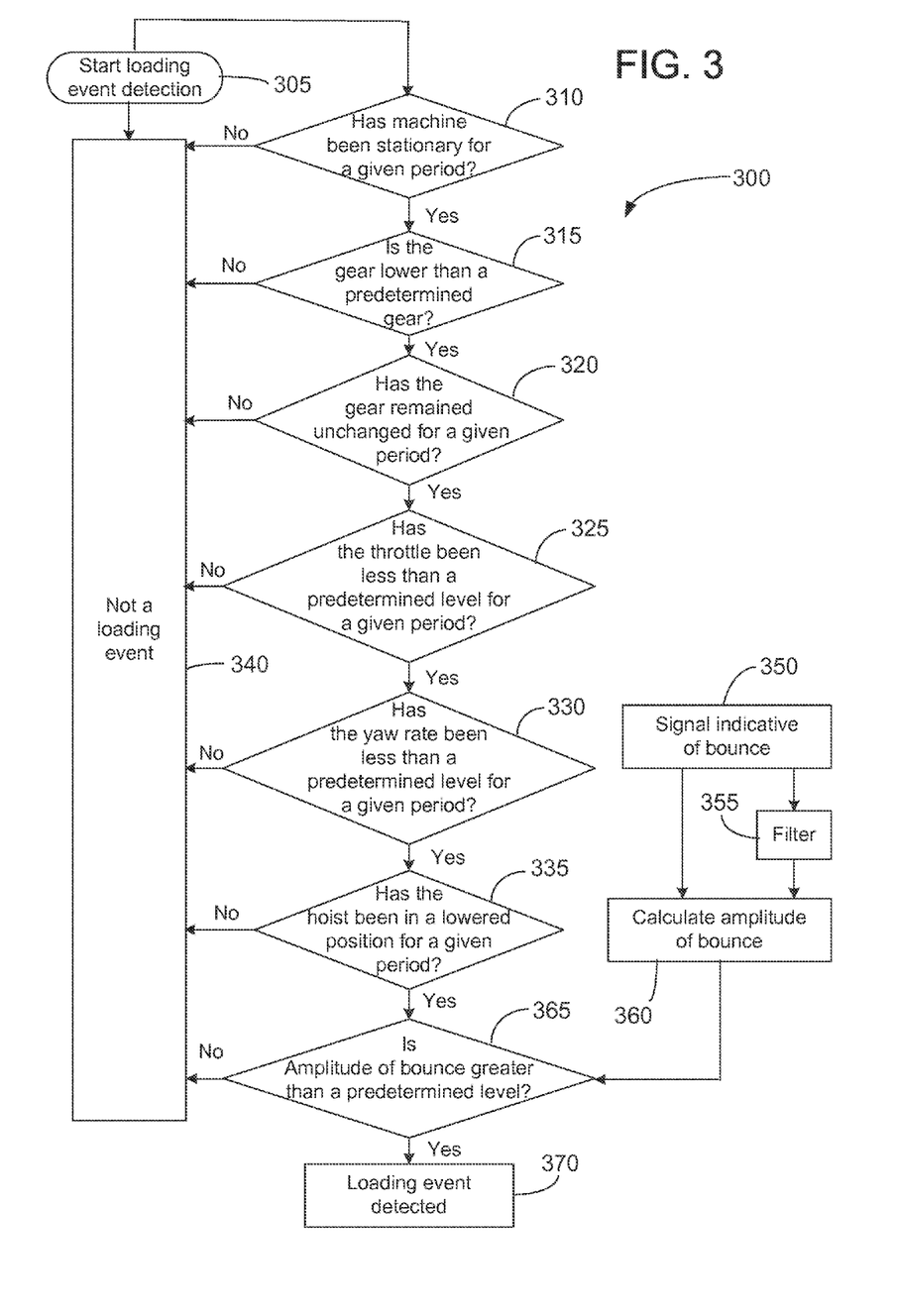
FIG. 3 is a flowchart summarizing operation of an exemplary method carried out by a programmable controller to determine when a loading event is occurring, in accordance with the disclosure.

Turning now to FIG. 3, there is illustrated a control strategy 300 for determining when a load hauling machine 100 is being loaded, the strategy 300 beginning at starting point 305. The control strategy 300 is utilized when the machine 100 only when certain conditions are present, or, in other words, when other factors that may cause movement of the machine 100 are not present. While the various steps are illustrated and discussed in a particular order, those of skill will appreciate that the steps may be performed in an alternate order or simultaneously in order to arrive at the final determination unless otherwise specifically noted. For example, the strategy first illustrates the determination of whether a number of conditions (decision boxes 310-335) exist for accurately determining if a loading event is occurring. The presence of the conditions reflected in decision boxes 310-335 minimize the likelihood that other factors may be responsible for movement of the machine 100 that may result from a loading event. While the decision boxes 310-335 associated with the conditions are illustrated as occurring sequentially, they may be determined in a different order or simultaneously.

The control strategy 300 is accurate when the machine 100 is essentially stationary, such as when a loading event would occur. Referring to decision box 310, the determination of whether the machine 100 has been stationary for a given period may include, for example, a determination of the speed of the cab 120. In this regard, a cab speed sensor 140 may provide a signal that is indicative of the cab speed to the controller 156, as indicated in FIG. 2. Alternately, a signal may be provided to the controller 156 based upon a speedometer (not illustrated) associated with the machine 100. According to the method, the cab speed may be compared to a predetermined constant reflecting maximum cab speed to determine whether the machine 100 is stationary. In order to ensure that the machine 100 has been stationary for a given period, the controller 156 may determine if the signal indicative of the cab speed has been true, that is, unchanged, for a given period. For example, if the signal indicative of the cab speed has been unchanged for 3 seconds or more, the control strategy 300 may take that the machine 100 has been stationary for a given period, satisfying the condition associated with decision box 310. If the machine 100 has not been essentially stationary for a given period, then a loading event determination will not be accurate.

To further ensure that the state of the machine 100 is not transitory, the transmission 126 of the machine 100 must have been below a predetermined gear for a given period of time. In this regard, the controller 156 determines whether the transmission 126 is in a gear lower than a predetermined constant reflecting the maximum gear (decision box 315). Information regarding the operation of the transmission 126 may be provided by any appropriate mechanism. For example, in some embodiments, the controller 156 directs operation of the transmission 126, including the operating gear utilized. Additionally or alternatively, sensors or the like associated with the transmission 126 may provide signals indicative of the operating. The controller 156 then compares the signal indicative of the gear to the predetermined constant reflecting the maximum gear. If the signal indicative of the gear shows that the transmission 126 is in a gear lower than the predetermined constant reflecting the maximum gear, then the condition associated with decision box 315 is satisfied. Conversely, if the transmission is not in a gear lower than the predetermined gear, then the condition associated with decision box 315 is not satisfied.

The controller 156 likewise determines whether the gear has remained unchanged for a given period (decision box 320). While any appropriate method may be utilized, in an embodiment, the controller 156 incorporates a unit delay, comparing a signal indicative of the gear to the previous signal indicative of the gear, that is, the gear value of the previous time set. In this way, the controller 156 may determine whether the gear has remained unchanged for a given period by comparing two or more such gear values associated with a given period, for example, 3 seconds. If the gear has remained unchanged for the given period, then the condition associated with decision box 320 is satisfied. Conversely, if the gear has been changed during that period, then the condition associated with decision box 320 is not satisfied.

In order to further minimize the opportunity for vibrations from the engine 124 from interfering with a determination of whether a loading event is occurring, the controller 156 determines whether the throttle has been less than a predetermined level for a given period (decision box 325). Throttle position may be determined by any appropriate mechanism. For example a sensor may be provided, or the operator control for the throttle 136 may provide a signal indicative of the throttle position to the controller 156 from which the controller 156 may compare the throttle position to a predetermined constant reflecting maximum throttle position. If the signal indicative of the throttle position shows that the throttle is lower than the predetermined constant reflecting maximum throttle position for at least a given period, for example, 3 seconds, then the condition associated with decision box 325 is satisfied. Conversely, if the throttle is not lower than the predetermined constant reflecting maximum throttle position for the given period, then the condition associated with decision box 325 is not satisfied.

In an articulated machine 100, such as the articulated truck 102 illustrated in FIG. 1, if the front and rear frame portions 104, 106 are not in substantial alignment, or if a steering control, such as a steering wheel (not shown), is turned significantly in one direction or the other, yaw established between the front and rear frame portions 104, 106 can result in an inaccurate loading detection. In accordance with the control strategy 300, the controller 156 determines whether a yaw rate has been less than a predetermined level for a given period (decision box 330). The yaw rate may be determined by any appropriate mechanism. For example, a yaw sensor 146 may provide a signal indicative of the yaw rate to the controller 156 (see FIG. 2). The controller 156 compares the signal indicative of the yaw rate to a predetermined constant reflecting maximum yaw rate. If the signal indicative of the yaw rate is lower than the predetermined constant reflecting maximum yaw rate for at least a given period, for example, 3 seconds, then the condition associated with decision box 330 is satisfied. Conversely, if the signal indicative of the yaw rate is not lower than the predetermined constant reflecting maximum yaw rate for the given period, then the condition associated with decision box 330 is not satisfied.

The lowering of a pivoted bed 130 from a dumping position or the movement of an ejecting plate to a refracted position may result in movement of the machine 100 when the bed 130 reaches the rear frame portion 106 or the ejecting plate reaches a fully retracted position, which may result in an unreliable determination of whether a loading event is occurring. When loading the bed 130 of a machine 100, the bed 130 will typically already be in a lowered position for a period in the case of a pivoted bed 130, such as the one illustrated in FIG. 1, or with the dumping plate in a refracted position in the case of an ejecting payload hauling machine. Accordingly, to ensure reliable detection of when a loading event is occurring, the controller 156 determines whether the hoist has been in a lowered (or retracted) position for a given period (see decision box 335).

The position of the hoist may be determined by any appropriate mechanism. For example, one or more sensors (not illustrated) may be provided in connection with the hoist cylinders 132. Alternatively, or additionally, the operator hoist control 134 may provide a signal indicative of the hoist position to the controller 156. The controller 156 compares the signal indicative of the hoist position to a predetermined constant reflecting maximum hoist position. In an embodiment, the hoist constant is representative of a position in which the hoist cylinders 132 are in a fully refracted position. If the signal indicative of the hoist position shows that the hoist is lower than the predetermined constant reflecting maximum hoist position for at least a given period, for example, 3 seconds, then the condition associated with decision box 335 is satisfied. Conversely, if the hoist is not lower than the predetermined constant reflecting maximum hoist position for the given period, then the condition associated with decision box 335 is not satisfied.

If any of the conditions reflected in decision boxes 310-335 are not satisfied, according to the control strategy 300, a loading event is not occurring (box 340). As a result, the process may begin again, or continue in a constant monitoring loop until such time as all conditions are satisfied.

Inasmuch as then the dumping of a material into the bed 130 will result in vertical movement of the bed 130, provided that each of the conditions represented in decision boxes 310-335 is satisfied, the vertical movement of the machine 100 will be indicative of a loading event. To provide a quantitative measurement of this movement, the strategy 300 utilizes an inertia sensor disposed to detect a sudden addition of weight to the bed 130 of the machine 100. The inertia sensor may include a plurality of sensors, and may, for example, measure any longitudinal, lateral and/or vertical acceleration of the machine 100. By way of example, the machine 100 may include one or more accelerometers 144, 145 that senses movement in the X or Z directions. The inertia sensor(s) may be disposed at any appropriate location on the machine 100. For example, they may be associated with the bed 130, or the rear frame portion 106.

In an embodiment, accelerometer 145 provides a signal indicative of the movement of the bed 130 in a vertical (Z) direction to the controller 156 (see FIG. 2; box 350 of FIG. 3). A filter is applied to the signal (box 355), and, based upon the original signal indicative of the movement of the bed and the filtered signal, the controller 156 calculates the amplitude of the bounce (box 360). The resultant amplitude of the bounce is compared to a predetermined constant indicative of a minimum bounce (decision box 365). The predetermined bounce level may be based upon any appropriate scale or defined number. For example, the predetermined constant indicative of a minimum bounce may be based on gravity, or a percentage of gravity, such as 0.2 g's. If the amplitude of the bounce is less than the predetermined constant indicative of a minimum bounce, then a loading event is not occurring (box 340). Conversely, if the amplitude of bounce is greater than the predetermined constant indicative of a minimum bounce, and the conditions reflected in decision boxes 310-335 have been satisfied, then a loading event has been detected (box 370).

While the strategy 300 illustrates the conditions of decision boxes 310-335 occurring prior to any calculation and comparison regarding the amplitude of bounce (boxes 350-370), the calculation and comparison regarding the amplitude of bounce (boxes 350-370) may be performed at any time or simultaneously with determination regarding the conditions shown in the decision boxes 310-335.

Figure 4:
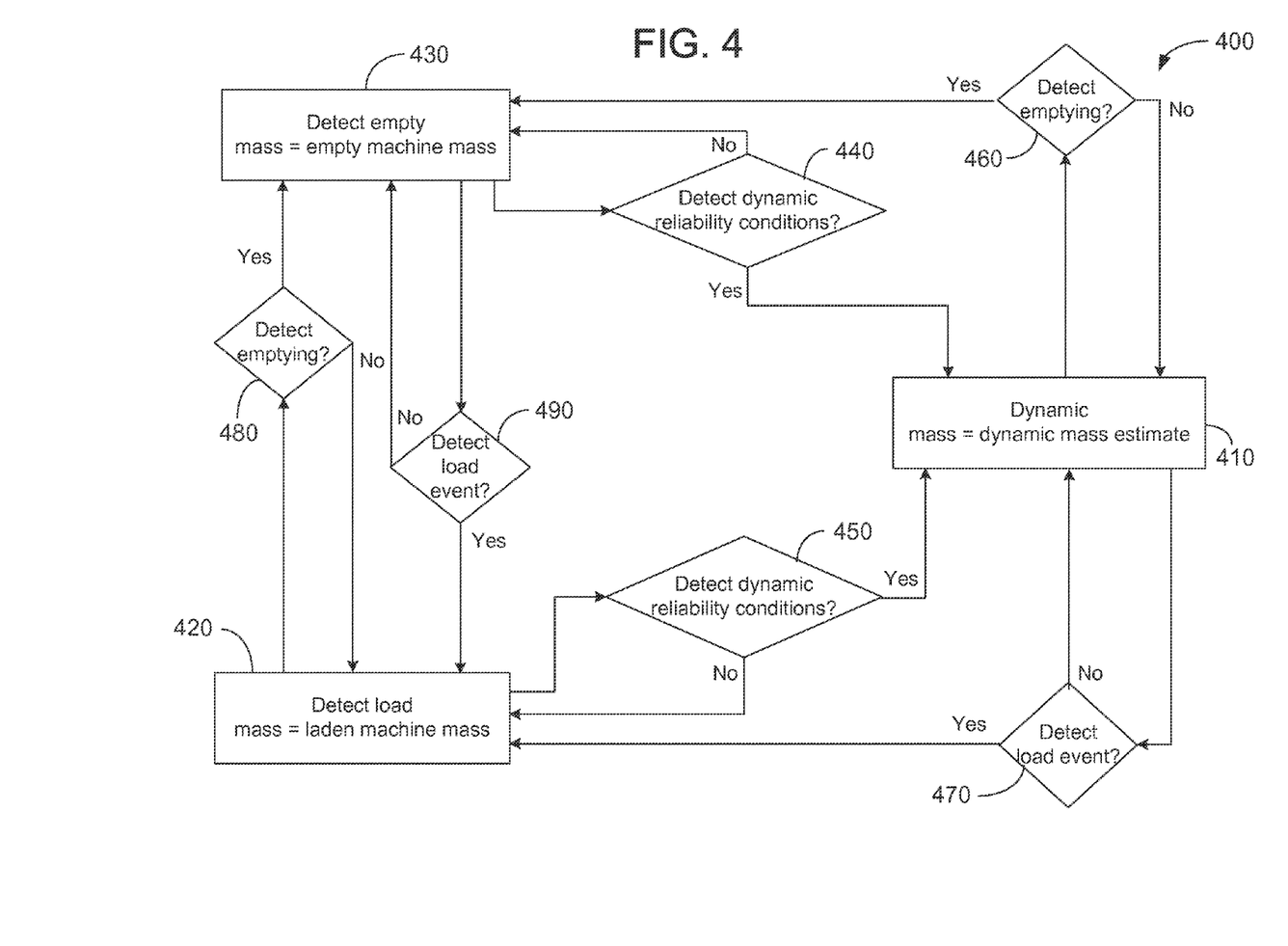
FIG. 4 is a flowchart summarizing operation of an exemplary strategy for determining the mass of a payload of a hauling machine incorporating the methods of FIG. 3.

The strategy 300 for estimating when a loading event is occurring may be a part of a larger strategy or integration algorithm for estimating the mass of a payload 133 of a machine 100. Turning to FIG. 4, there is shown an exemplary integration strategy 400 for the estimation of the mass of a payload 133 during various conditions. The integration strategy 400 may include a strategy (box 410) for determining a dynamic mass estimate, along with a strategy (box 420) related to a loading event, and a strategy (box 430) related to an emptying event. In this way, while the machine 100 is operating, functions the programmable controller 156 monitors various functions and parameters of the machine 100 and the environment to determine what, if any mass determination is appropriate. The calculated, estimated mass may be utilized in algorithms for continued determinations related to the machine 100.

From the determination of a dynamic mass estimate (box 410), if emptying of the bed 130 is detected (decision box 460), the strategy 430 directed to an emptying event may be applied to determine whether the bed 130 is empty, there is no payload 133 contained in the bed 130. Conversely, if a load event is detected (decision box 470), the strategy 420 directed to a loading event may be applied to determine if a loading event is occurring.

Similarly, from the determination of a loading event by the strategy 420, if the conditions are detected for the reliable determination of a dynamic mass estimate (decision box 450), then the strategy 410 for the determination of the mass under dynamic conditions may be applied. Conversely, if an emptying event is detected (decision box 480), the strategy 430 directed to an emptying even may be applied to determine whether the bed 130 is empty.

Finally, from the determination of an emptying event by the strategy 430, if the conditions are detected for the reliable determination of a dynamic mass estimate (decision box 440), then the strategy 410 for the determination of the mass under dynamic conditions may be applied. Again, conversely, if a load event is detected (decision box 490), the strategy 420 directed to a loading event may be applied to determine if a loading event is occurring.

Figure 5:
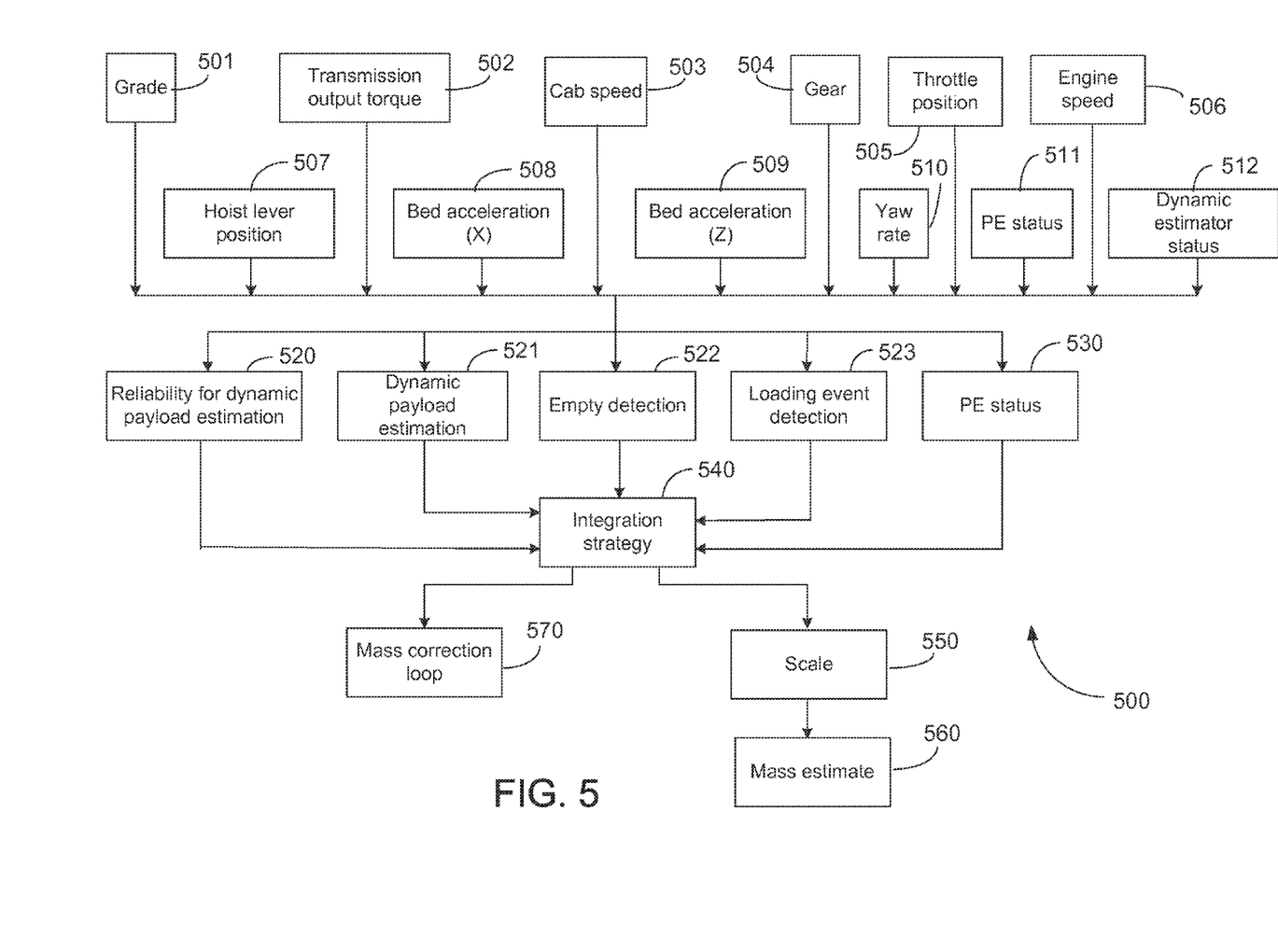
FIG. 5 is a flowchart summarizing operation of an exemplary strategy for determining the mass of a payload of a hauling machine incorporating the methods of FIGS. 3-4.

The integration strategy 400 of FIG. 4 is shown the context of the larger context of a top level algorithm 500 in FIG. 5. Information may be provided from various sources, such as, for example, those illustrated in FIG. 2. By way of example only, information may be provided regarding the grade (box 501) from the grade detector 150, transmission output torque (box 502) based upon calculations or information from the transmission 126, cab speed (box 503) from the cab speed sensor 140, gear (box 504) based upon the operator transmission gear control 138, throttle position (box 505) based upon a sensor or the operator control device for the throttle 136, engine speed (box 506) based upon the engine speed sensor 142, hoist lever position (box 507) based upon a sensor or the operator hoist control 134, bed acceleration in the X and Z directions (boxes 508 and 509) based upon accelerometers 144, 145, and the yaw rate (box 510) based upon a yaw sensor 146. Further, in an embodiment, any appropriate mechanism may be utilized to provide an indication of whether sensors and other devices providing information are in working condition (see, for example, PC status 511 and dynamic estimator status 512).

From the information provided, individual strategies 520-523 may be applied for determining the reliability of a dynamic payload mass estimation, estimating a dynamic payload mass, emptying detection, and loading event detection. Again, an embodiment may further include any appropriate mechanism for providing an indication that all individual strategies are proceeding (box 530). From the operation of the individual strategies 520-523 along with the integration strategy (box 540) such as the integration strategy 400 illustrated in FIG. 4, an estimated mass is determined. The estimated mass is then scaled (box 540) for delivery to a data link module (not illustrated) to provide a broadcast mass estimate (box 550). Further, the estimated mass obtained may be utilized in the additional algorithms, as indicated by box 570, the mass correction loop.

INDUSTRIAL APPLICABILITY

The present disclosure is applicable to machines 100 including a bed 130 for carrying a payload 133. Embodiments of the disclosed strategy may have the ability to estimate payload mass without the use of any other weight sensors.

Some embodiments may be applicable to machines 100 including a pivoted bed 130. Some embodiments may be applicable to machines 100 including an ejector bed.

The strategy for determining the mass of a payload 133 may be utilized at opportune times when the calculation will be accurate.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. In a hauling machine having a bed adapted to haul a payload, a method, implemented by a programmable controller, of determining whether an event loading the bed is occurring, the method comprising:
   determining if the machine has been stationary for a given period,
   determining if the bed is in a position to be loaded,
   determining if other factors have contributed to movement of the machine,
   filtering an accelerometer signal associated with movement of the machine to calculate an amplitude of bounce, and
   comparing the amplitude of bounce with a predetermined constant reflecting a minimum amplitude of bounce.

2. The method of claim 1 further including identifying a loading event if the amplitude of bounce is greater than the predetermined constant reflecting a minimum amplitude of bounce, the machine has been stationary for a given period, the bed is in a position to be loaded, and other factors have not caused movement of the machine.

3. The method of claim 1 wherein the step of determining if other factors have contributed to movement of the machine includes determining whether a throttle of the machine has been less than a predetermined level for a given period.

4. The method of claim 3 wherein the step of determining if other factors have contributed to movement of the machine includes determining if the transmission is in a gear lower than a predetermined gear and has not been changed within a given period of time.

5. The method of claim 4 wherein the step of determining if other factors have contributed to movement of the machine includes determining if a yaw rate is less than a predetermined level for a given period in an articulated machine.

6. The method of claim 1 wherein the step of determining if other factors have contributed to movement of the machine includes at least one of determining if a yaw rate is less than a predetermined level for a given period in an articulated machine, and determining if the transmission is in a gear lower than a predetermined gear and has not been changed within a given period of time.

7. The method of claim 5 wherein the step of determining if the bed is in a position to be loaded includes determining if at least one hoist cylinder coupled to bed and adapted to effectuate dumping of a payload contained in the bed has been in a retracted position for a given period.

8. The method of claim 1 wherein the step of determining if the bed is in a position to be loaded includes determining if at least one hoist cylinder coupled to bed and adapted to effectuate dumping of a payload contained in the bed has been in a retracted position for a given period.

9. The method of claim 8 wherein the step of determining if at least one hoist cylinder coupled to bed and adapted to effectuate dumping of a payload contained in the bed has been in a retracted position for a given period includes determining if at least one hoist cylinder adapted to move a pivoted bed between a load position and a dump position is in a retracted position.

10. The method of claim 8 wherein the step of determining if at least one hoist cylinder coupled to bed and adapted to effectuate dumping of a payload contained in the bed has been in a retracted position for a given period includes determining if at least one hoist cylinder adapted to move an ejector plate of an ejector bed between a load position and a dump position is in a retracted position.

11. A non-transitory computer-readable medium including computer-executable instructions facilitating performing a method, implemented by a programmable controller, of determining the occurrence of an event loading the bed of a hauling machine, the method comprising:
   determining if the machine has been stationary for a given period,
   determining if the bed is in a position to be loaded,
   determining if other factors have contributed to movement of the machine,
   filtering an accelerometer signal associated with movement of the machine to calculate an amplitude of bounce, and
   comparing the amplitude of bounce with a predetermined constant reflecting a minimum amplitude of bounce.

12. The non-transitory computer-readable medium of claim 11 wherein the method further includes identifying a loading event if the amplitude of bounce is greater than the predetermined constant reflecting a minimum amplitude of bounce, the machine has been stationary for a given period, the bed is in a position to be loaded, and other factors have not caused movement of the machine.

13. The non-transitory computer-readable medium of claim 11 wherein the step of determining if other factors have contributed to movement of the machine includes determining whether a throttle of the machine has been less than a predetermined level for a given period.

14. The non-transitory computer-readable medium of claim 11 wherein the step of determining if other factors have contributed to movement of the machine includes at least one of determining if the transmission is in a gear lower than a predetermined gear and has not been changed within a given period of time, and determining if a yaw rate is less than a predetermined level for a given period in an articulated machine.

15. The non-transitory computer-readable medium of claim 11 wherein the step of determining if other factors have contributed to movement of the machine includes
   determining whether a throttle of the machine has been less than a predetermined level for a given period, and
   determining if the transmission is in a gear lower than a predetermined gear and has not been changed within a given period of time.

16. The non-transitory computer-readable medium of claim 11 wherein the step of determining if other factors have contributed to movement of the machine includes determining if a yaw rate is less than a predetermined level for a given period in an articulated machine.

17. The non-transitory computer-readable medium of claim 11 wherein the step of determining if other factors have contributed to movement of the machine includes
   determining whether a throttle of the machine has been less than a predetermined level for a given period,
   determining if the transmission is in a gear lower than a predetermined gear and has not been changed within a given period of time, and
   determining if a yaw rate is less than a predetermined level for a given period in an articulated machine.

18. The non-transitory computer-readable medium of claim 11 wherein the step of determining if the bed is in a position to be loaded includes determining if at least one hoist cylinder coupled to bed and adapted to effectuate dumping of a payload contained in the bed has been in a retracted position for a given period.

19. A hauling machine comprising
a plurality of moveable ground engaging elements,
a bed adapted to carry a payload,
at least one hoist cylinder associated with the bed and adapted to move between a retracted position associated with a loaded position of the bed, and an extended position associated with a dump position of at least a portion of the bed,
a transmission adapted to operate in a plurality of gears,
an engine,
a throttle associated with the engine,
an accelerometer adapted to indicate bounce movement of the bed,
a programmable controller configured by computer-executable instructions to detect if a loading event is occurring, the programmable controller using a set of parameters including:
period of time in the current gear,
whether the gear is less than a predetermined gear,
movement of the machine within a given period,
throttle position,
hoist position,
amplitude of bounce movement of the bed, and
reference constants including
a predetermined constant reflecting maximum gear position,
a predetermined constant reflecting maximum throttle position,
a predetermined constant reflecting hoist position, and
a predetermined constant reflecting minimum amplitude of bounce.

20. The hauling machine of claim 19 further including front and rear frame portions articulated relative to one another, and a yaw sensor, and wherein the programmable controller is configured to use a set of parameters further including yaw rate and a predetermined constant reflecting a maximum yaw rate.

* * * * *

UNITED STATES PATENT AND TRADEMARK OFFICE
CERTIFICATE OF CORRECTION

PATENT NO. : 8,903,612 B2
APPLICATION NO. : 13/871412
DATED : December 2, 2014
INVENTOR(S) : Tejeda et al.

Page 1 of 1

It is certified that error appears in the above-identified patent and that said Letters Patent is hereby corrected as shown below:

In the specification

Column 5, line 62, delete "refracted" and insert -- retracted --.

Column 6, line 3, delete "refracted" and insert -- retracted --.

Column 6, line 19, delete "refracted" and insert -- retracted --.

Signed and Sealed this
Seventeenth Day of November, 2015

Michelle K. Lee
*Director of the United States Patent and Trademark Office*